United States Patent
Gollier (10) Patent No.: US 9,651,734 B2
(45) Date of Patent: May 16, 2017

(54) AUTOSTEREOSCOPIC DISPLAY ILLUMINATION APPARATUSES AND AUTOSTEREOSCOPIC DISPLAY DEVICES INCORPORATING THE SAME

(71) Applicant: Jacques Gollier, Painted Post, NY (US)

(72) Inventor: Jacques Gollier, Painted Post, NY (US)

(73) Assignee: Corning Incorporated, Corning, NY (US)

(*) Notice: Subject to any disclaimer, the term of this patent is extended or adjusted under 35 U.S.C. 154(b) by 732 days.

(21) Appl. No.: 13/645,574

(22) Filed: Oct. 5, 2012

(65) Prior Publication Data

US 2014/0098011 A1    Apr. 10, 2014

Related U.S. Application Data

(60) Provisional application No. 61/546,303, filed on Oct. 12, 2011.

(51) Int. Cl.
*G09G 3/34* (2006.01)
*G02B 6/036* (2006.01)
(Continued)

(52) U.S. Cl.
CPC ..... *G02B 6/03644* (2013.01); *G02B 6/03627* (2013.01); *G09G 3/3413* (2013.01); *B82Y 20/00* (2013.01); *G02B 6/06* (2013.01)

(58) Field of Classification Search
CPC ... G09G 2320/0233; G09G 2320/0252; G09G 2320/0285; G09G 2360/144; G09G 2360/145; G09G 3/003; G09G 3/3413
(Continued)

(56) References Cited

U.S. PATENT DOCUMENTS 5,410,345 A    4/1995    Eichenlaub
5,542,016 A *  7/1996    Kaschke .................. 385/123
(Continued)

FOREIGN PATENT DOCUMENTS

CN    101666915 A    3/2010
GB    2410093        7/2005
(Continued)

OTHER PUBLICATIONS

"How does DTI's 3D technology work?", 2012, Dimension Technologies Inc. website: http://www.dti3d.com/component/option,com_kb/page,articles/articleid,1/Itemid,94/.
(Continued)

*Primary Examiner* — Kent Chang
*Assistant Examiner* — Scott Au
(74) *Attorney, Agent, or Firm* — Svetlana Z. Short (57) ABSTRACT

Embodiments are generally directed to autostereoscopic display device illumination apparatuses having one or more optical fibers (i.e., flexible light diffusing waveguides) as linear emitters for illuminating columns of pixels of a display panel within the autostereoscopic display device. In some embodiments, the linear emitters are defined by a single optical fiber that is arranged on a substrate in a serpentine manner to form an array of linear emitters. In some embodiments, the linear emitters are defined by several optical fibers. Illumination apparatuses of some embodiments may also include a prism device configured to create multiple images of the optical fiber(s).

22 Claims, 7 Drawing Sheets

(51) Int. Cl.
*B82Y 20/00* (2011.01)
*G02B 6/06* (2006.01)

(58) Field of Classification Search
USPC .................. 345/55, 697; 362/558, 600–610; 977/952
See application file for complete search history.

(56) References Cited

U.S. PATENT DOCUMENTS

| | | | |
|---|---|---|---|
| 5,956,001 A * | 9/1999 | Sumida et al. | 345/55 |
| 6,128,059 A * | 10/2000 | Nishiguchi | 349/129 |
| 6,327,019 B1 * | 12/2001 | Patel et al. | 349/196 |
| 7,450,806 B2 | 11/2008 | Bookbinder et al. | |
| 2001/0050667 A1 | 12/2001 | Kim et al. | |
| 2003/0071934 A1 * | 4/2003 | Saccomanno et al. | 349/61 |
| 2007/0010318 A1 * | 1/2007 | Rigsby et al. | 463/20 |
| 2007/0058388 A1 | 3/2007 | Takatori et al. | |
| 2007/0104437 A1 | 5/2007 | Bookbinder et al. | |
| 2007/0247522 A1 * | 10/2007 | Holliman | 348/46 |
| 2010/0214208 A1 | 8/2010 | Itoh et al. | |
| 2010/0238666 A1 * | 9/2010 | Ominato et al. | 362/308 |
| 2011/0122646 A1 | 5/2011 | Bickham et al. | |
| 2013/0272014 A1 | 10/2013 | Logunov et al. | |
| 2014/0098011 A1 | 4/2014 | Gollier | |

FOREIGN PATENT DOCUMENTS

| | | |
|---|---|---|
| WO | 2010/054199 | 5/2010 |
| WO | 2011063214 | 5/2011 |

OTHER PUBLICATIONS

PCT/US2012/059416 Search Report.
English Translation of CN201280049709.X Notice of First Office Action Dated Oct. 26, 2016; 12 Pages; Chinese Patent Office.

* cited by examiner

AUTOSTEREOSCOPIC DISPLAY ILLUMINATION APPARATUSES AND AUTOSTEREOSCOPIC DISPLAY DEVICES INCORPORATING THE SAME

CROSS-REFERENCE TO RELATED APPLICATIONS

This application claims the benefit of priority under 35 U.S.C. §120 of U.S. Application Ser. No. 61/546,303 filed on Oct. 12, 2011 the content of which is relied upon and incorporated herein by reference in its entirety.

BACKGROUND

Embodiments of the present disclosure relate to autostereoscopic display illumination apparatuses and, more particularly, autostereoscopic display illumination apparatuses comprising one or more optical fibers. Embodiments also relate to autostereoscopic displays devices incorporating optical fiber illumination apparatuses.

BRIEF SUMMARY

Autostereoscopic display devices are capable of producing three-dimensional images without requiring observers to wear special glasses (e.g., active shutter glasses or passive polarizing glasses). Such autostereoscopic display devices may produce three-dimensional images by illuminating columns of pixels of a display panel (e.g., a liquid crystal display panel) such that each eye of an observer sees a different pixel of the panel. By addressing individual pixels inside of the display panel, a three-dimensional impression can therefore be created since each eye is seeing a different set of pixels corresponding to the displayed image.

Columns of pixels are illuminated by linear emitters that are positioned behind the display panel such that light emitted by the linear emitters passes through the pixels of the display panel, as well as through additional optics, and is seen by the observer. The linear emitters should be capable of producing enough light to create an image that has adequate brightness. Conventional linear emitters may include xenon flash lamps, fluorescent lamps, incandescent lamps, and light emitting diodes (LED).

Although linear emitters comprised of LEDs (e.g., white LEDs) may produce a significant amount of light, such linear emitters may be costly because many LEDs for each linear emitter of the display are needed. Additionally, for a display system that creates N simultaneous views, it can be shown that the linear emitters should be placed on a pitch that is approximately equal to N times the pixel pitch of the display panel. As an example and not a limitation, with a 1080p display device displaying 9 simultaneous views, about 213 linear emitters may be needed (1920/9).

Additionally, it is desirable that the linear emitters be as thin as possible to avoid having cross-talk between the views that are generated. If the width of the linear emitters increases, the angular extend of the cones of light emitted by individual emitters increases and, therefore, individual view windows are no longer separated. For example, linear emitters comprised of individual LEDs may be large enough to create cross-talk between the views.

Embodiments of the present disclosure are directed to illumination apparatuses for autostereoscopic display devices that utilize one or more optical fibers that are configured to scatter or diffuse light out of the sides of the fiber, such that light is guided away from a core of the optical fiber and through the outer surfaces to provide linear illumination. As used herein, the phrase "flexible light diffusing waveguide" refers to such optical fibers. The optical fibers may also be referred to as "leaky optical fibers" because light leaks (e.g., is scattered or diffused) out of the sides of the optical fiber.

Use of optical fibers for the linear emitters of an illumination apparatus for autostereoscopic display devices presents several advantages including, but not limited to, reduced cost because of the reduction of individual emitters needed (e.g., LEDs), as well as reduced width of the linear emitters to prevent cross-talk between views.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Reference will now be made in detail to the present preferred embodiments, examples of which are illustrated in the accompanying drawings. Whenever possible, the same reference numerals will be used throughout the drawings to refer to the same or like parts.

The following detailed description represents embodiments that are intended to provide an overview or framework for understanding the nature and character of the claims. The accompanied drawings are included to provide a further understanding of the claims and constitute a part of the specification. The drawings illustrate various embodiments, and together with the descriptions serve to explain the principles and operations of these embodiments as claimed.

Various modifications and alterations may be made to the examples within the scope of the claims, and aspects of the different examples may be combined in different ways to achieve further examples. Accordingly, the true scope of the claims is to be understood from the entirety of the present disclosure in view of, but not limited to, the embodiments described herein.

Embodiments are generally directed to autostereoscopic display device illumination apparatuses comprising one or more optical fibers (i.e., flexible light diffusing waveguides) as linear emitters for illuminating columns of pixels of a display panel within the autostereoscopic display device. In some embodiments, the linear emitters are comprised of a single optical fiber that is arranged on a substrate in a serpentine manner to form an array of linear emitters. In some embodiments, the linear emitters are comprised of several optical fibers.

The term "flexible light diffusing waveguide" refers to a flexible optical waveguide (e.g., an optical fiber) employing nano-sized structures that are utilized to scatter or diffuse light out of the sides of the fiber, such that light is guided away from the core of the waveguide and through the outer surfaces of the waveguide to provide illumination. Flexible light diffusing waveguides are disclosed in U.S. patent application Ser. No. 12/950,045 (United States Patent Application Publication No. US 2011/0122646 A1), which is incorporated in its entirety herein by reference.

The term "waveguide segment" may refer to either a single linear light diffusing waveguide or a linear part of a flexible light diffusing waveguide located between bent parts or segments of the same flexible light diffusing waveguide. For example, a single flexible light diffusing waveguide can be bent repeatedly by 180 degrees to provide a series of parallel waveguide segments that are disposed one adjacent to another and which are generally arranged in a plane.

The term "light source" refers to a laser, light emitting diode or other component capable of emitting electromagnetic radiation that is either in the visible wavelength range or is of a wavelength that can interact with a luminophore to emit light in the visible wavelength range.

The expression "controlling the color of light emitted" refers to either dynamic control in which the wavelength of the emitted light can be varied as desired with time, or passive control in which the emitted color is predetermined, such as by selection of a particular luminophore and/or light source.

The term "luminophore" refers to an atom or chemical compound that manifests luminescence, and includes a variety of fluorophores and phosphors.

Terms such as "horizontal," "vertical," "front," "back," etc., and the use of Cartesian Coordinates are for the sake of reference in the drawings and for ease of description and are not intended to be strictly limiting either in the description or in the claims as to an absolute orientation and/or direction.

The following terms and phrases are used in connection to light diffusing fibers having nano-sized structures.

The "refractive index profile" is the relationship between the refractive index or the relative refractive index and the waveguide (fiber) radius.

The "relative refractive index percent" is defined as $$\Delta(r)\% = 100 \times [n(r)^2 - n_{REF}^2)]/2n(r)^2,$$

where n(r) is the refractive index at radius r, unless otherwise specified. The relative refractive index percent is defined at 850 nm unless otherwise specified. In one aspect, the reference index $n_{REF}$ is silica glass with a refractive index of 1.452498 at 850 nm, in another aspect it is the maximum refractive index of the cladding glass at 850 nm. As used herein, the relative refractive index is represented by $\Delta$ and its values are given in units of "%," unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants.

Likewise, one or more other dopants which are not downdopants may be present in a region of an optical fiber having a negative relative refractive index.

The term "α-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is an exponent which is a real number.

As used herein, the term "parabolic" therefore includes substantially parabolically shaped refractive index profiles which may vary slightly from an α value of 2.0 at one or more points in the core, as well as profiles with minor variations and/or a centerline dip. In some exemplary embodiments, α is greater than 1.5 and less than 2.5, more preferably greater than 1.7 and 2.3 and even more preferably between 1.8 and 2.3 as measured at 850 nm. In other embodiments, one or more segments of the refractive index profile have a substantially step index shape with an α value greater than 8, more preferably greater than 10 even more preferably greater than 20 as measured at 850 nm.

The term "nano-structured fiber region" describes the fiber having a region or area with a large number (greater than 50) of gas filled voids, or other nano-sized structures, e.g., more than 50, more than 100, or more than 200 voids in the cross-section of the fiber. The gas filled voids may contain, for example, $SO_2$, Kr, Ar, $CO_2$, $N_2$, $O_2$, or mixture thereof. The cross-sectional size (e.g., diameter) of nano-sized structures (e.g., voids) as described herein may vary from 10 nm to 1 micron (for example, 50 nm-500 nm), and the length may vary from 1 millimeter 50 meters (e.g., 2 mm to 5 meters, or 5 mm to 1 m range).

Figure 1A:
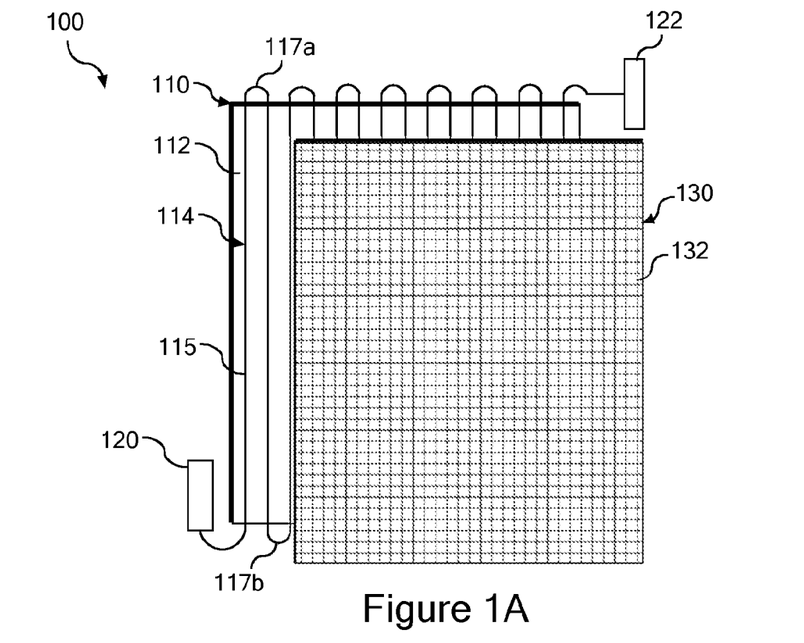
FIG. 1A is a schematic front view of an illumination apparatus and a display panel of an autostereoscopic display device according to one or more embodiments shown and described herein.
Figure 1B:
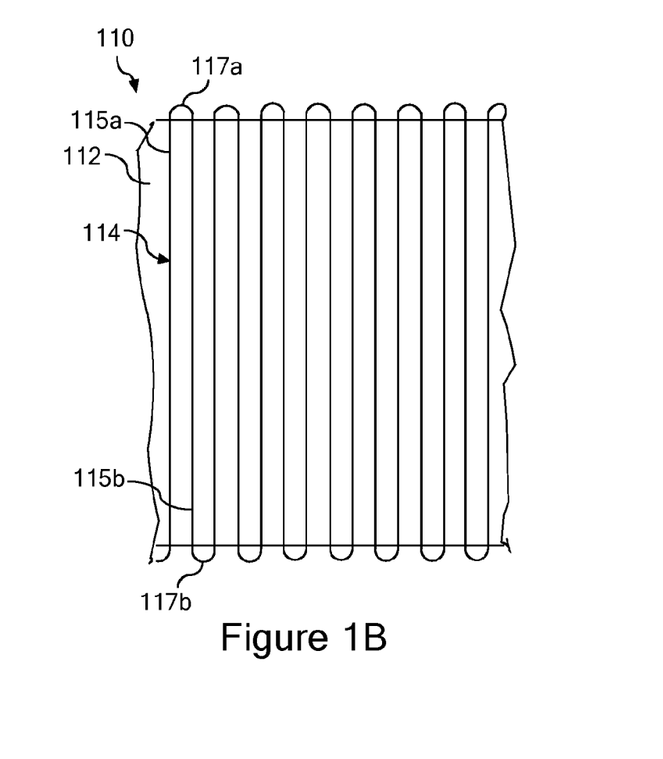
FIG. 1B is a schematic front view of a portion of the illumination apparatus illustrated in FIG. 1A.

Referring now to FIG. 1A, an autostereoscopic display device 100 according to one embodiment is illustrated. It is noted that the components of the autostereoscopic display device 100 are not drawn to scale, and that actual embodiments may be smaller or larger (or of a different geometric configuration) than the autostereoscopic display device 100 depicted in FIG. 1A. The autostereoscopic display device 100 generally comprises an illumination apparatus 110 and a display panel 130. The display panel 130 may be configured as one or more display technologies that use a backlighting illumination source, such as a liquid crystal display (LCD), for example. The display panel 130 generally comprises an array of individual pixels 132. As an example and not a limitation, each pixel may comprise a red portion, a green portion, and a blue portion that are individually addressable to control the color of the pixel.

According to one embodiment, the illumination apparatus 110 generally comprises an optical fiber 114 coupled to a substrate 112. In an alternative embodiment, the optical fiber 114 is not coupled to a substrate. As described in more detail below, the optical fiber 114 is configured to emit light along its length from its core such that it behaves has a linear light emitter.

The optical fiber 114 of the embodiment illustrated in FIG. 1A is arranged on the substrate 112 in a serpentine manner, such that the linear emitters of the illumination apparatus 110 are formed by straight portions 115 of the optical fiber 114. Although the optical fiber 114 is illustrated as having the straight portions 115 positioned vertically, embodiments are not limited thereto. For example, the optical fiber 114 may be arranged such that the straight portions are angled with respect to vertical. Additionally, for a display system that creates N simultaneous views, it can be shown that the linear emitters should be placed on a pitch that is approximately equal to N times the pixel pitch of the display panel. As an example and not a limitation, with a 1080p display device displaying 9 simultaneous views, about 213 linear emitters may be needed (1920/9).

The optical fiber 114 may be coupled to a light source 120 at a first end. The light source 120 may be any light source capable of emitting radiation having a wavelength(s) in the visible spectrum such that the optical fiber 114 emits light from its core uniformly along its length at an optical power that fully illuminates each column of pixels of the display panel 130 to produce the various views. Exemplary light sources 120 may include, but are not limited to, lasers and LEDs. The illumination apparatus 110 may also comprise a termination device 122. In some embodiments, the termination device 122 is reflective such that light at the end of the optical fiber 114 is reflected back through the optical fiber 114 toward the light source 120. In other embodiments, the termination device 122 is absorptive such that light reaching the end of the optical fiber 114 is absorbed.

Figure 1C:
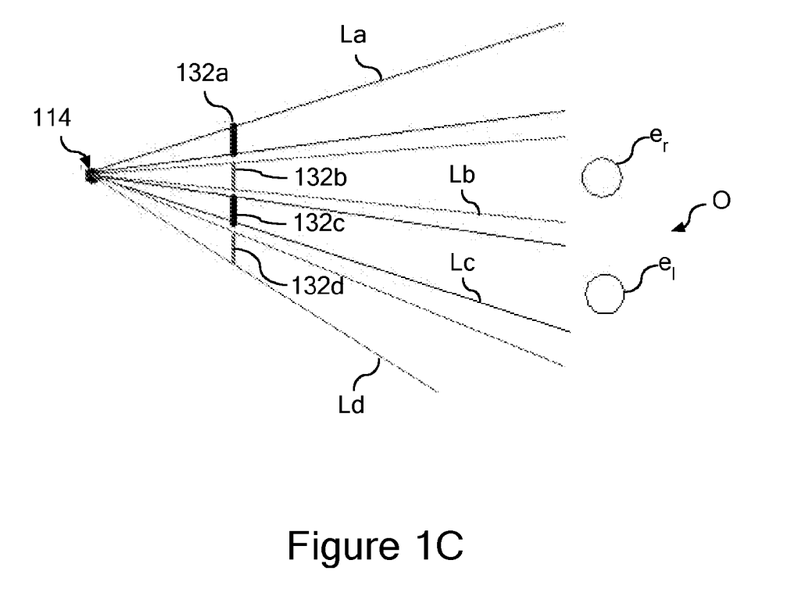
FIG. 1C is a schematic representation of an observer viewing pixels illuminated by an optical fiber according to one or more embodiments shown and described herein.

As shown in FIGS. 1A and 1C, the optical fiber 114 is coupled to the substrate 112 such that it has straight portions (e.g., 115a, 115b), top bent portions 117a, and bottom bent portions 117b. The radius of the top and bottom bent portions 117a, 117b may depend on the pixel pitch and overall size of the display panel to be illuminated. In some embodiments, the top bent portions and the bottom bent portions are covered (e.g., by a plate or an opaque coating) such that light is not emitted toward the display panel 130 from the bent portions. In other embodiments, light is emitted from the top and bottom bent portions.

Referring specifically to FIG. 1A, it is noted that embodiments of the autostereoscopic display device 100 may comprise additional optical components between the illumination apparatus 110 and the display panel 130. For example, a lenticular lens assembly (not shown) and/or a diffuser (not shown) may be positioned in an optical path after the illumination apparatus 110 to focus the light emitted by the optical fiber 114 onto the pixels 132 of the display panel 130, as well as to broaden the angle of the light emitted by the optical fiber 114.

FIG. 1C is a schematic illustration of a top view of a straight portion of an optical fiber 114 emitting light cones La, Lb, Lc, Ld, through pixels 132a, 132b, 132c, 132d, respectively, toward an observer O. It should be understood that FIG. 1C depicts only a portion of an autostereoscopic display device, and that many other linear emitters and pixels may be provided. The optical fiber 114 is configured to emit light along its length such that the pixels associated with the particular linear emitter defined by the straight portion of the optical fiber 114 receives rear illumination. As shown in FIG. 1C, light cone Lb passes through pixel 132b and light cone Lc passes through pixel 132c, and so on. It is noted that the light emitted by the optical fiber will illuminate pixels that compose a pixel column that goes into the page of FIG. 1C. The observer O is located a particular distance from the autostereoscopic display device 100 (e.g., 3 meters). Adjacent light cones passing through the pixels are such that they are separated by a distance that is approximately equal to the distance measured between the eyes of the observer. In the embodiment illustrated in FIG. 1C, the observer's right eye $e_r$ views pixel 132b, and the observer's left eye $e_l$ views pixel 132c by light cones Lb, Lc, respectively.

Figure 1D:
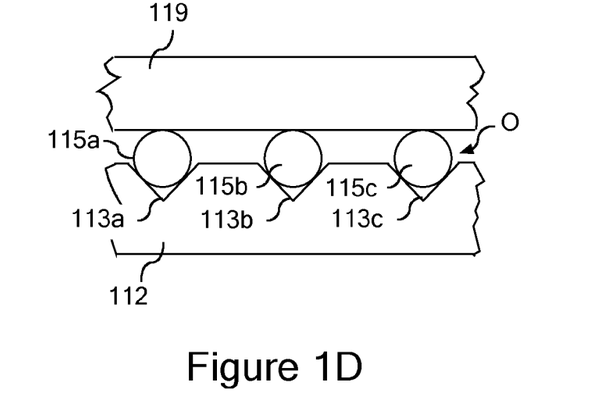
FIG. 1D is a schematic view of a section of an illumination apparatus according to one or more embodiments shown and described herein.

Referring now to FIG. 1D, a partial cross-sectional view of an illumination apparatus 110 is illustrated. The illustrated illumination apparatus 110 comprises a substrate 112, a plurality of straight portions 115a, 115b, 115c of an optical fiber 114 as described above, and a transparent substrate 119. The substrate 112 may comprise a plurality of grooves 113a, 113b, 113c (e.g., V-shaped grooves, U-shaped grooves, etc.) into which the optical fiber 114 is positioned. In other embodiments, the optical fiber 114 may be positioned on the substrate 112 without grooves. The transparent substrate may be made of a material that is transmissive to the wavelength(s) of the light emitted by the optical fiber 114 (e.g., a glass material or a plastic material). In some embodiments, the illumination apparatus 110 may further comprise baffles (not shown) extending from the substrate 112 between the grooves 113a, 113b, 113c. The baffles may aid in forming defined light cones that reduce the amount of cross-talk seen by the observer.

The autostereoscopic display device can display multiple views in order to show multiple perspective of the scene. To simultaneously display N views, the linear emitters need to be put on a pitch approximately equal to the pitch of the pixels multiplied by N. That is, in the autostereoscopic display device a number of straight portions of the illumination apparatus may be approximately equal to a number of pixels along a width of the array of pixels divided by a number of simultaneous views N. In at least some embodiments the light emitted by the light source passes through adjacent pixels 132i and creates light cones Li separated by a distance approximately equal (within ±20%, and more preferably within ±10%) to the distance between the centers of observer's eyes $e_r$, $e_l$, (see FIG. 1C, for example), typically about 70 mm to about 90 mm.

Figure 2:
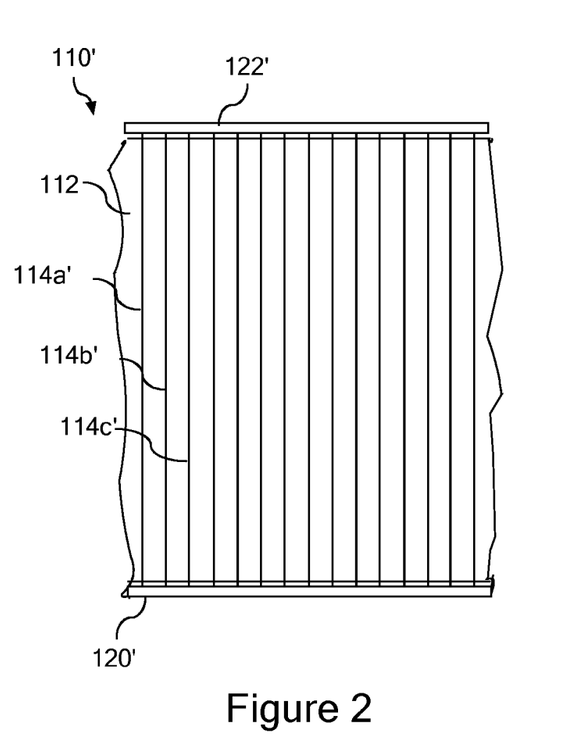
FIG. 2 is a schematic front view of an illumination apparatus according to one or more embodiments shown and described herein.

FIG. 2 depicts an embodiment wherein the linear emitters are not defined by a single serpentine optical fiber as described above, but rather as a plurality of individual optical fibers (e.g., optical fibers 114a', 114b', and 114c', collectively "114'"). The number of optical fibers 114' may depend on the number of desired linear emitters. For example, in a 1080p display device, there may be about 213 optical fibers 114' acting as linear emitters. The light source 120' may be located along a length of the substrate 112 such that the individual optical fibers 114' are optically coupled to the light source 120'. The optical fibers 114' may be terminated by a termination device 122' at an opposite end of the substrate 112. The termination device 122' may either reflect or absorb light, as described above. In some embodiments, a single optical fiber may define two or more linear emitters. For example, a single optical fiber may have one bent portion such that it defines two linear emitters.

Figure 3A:
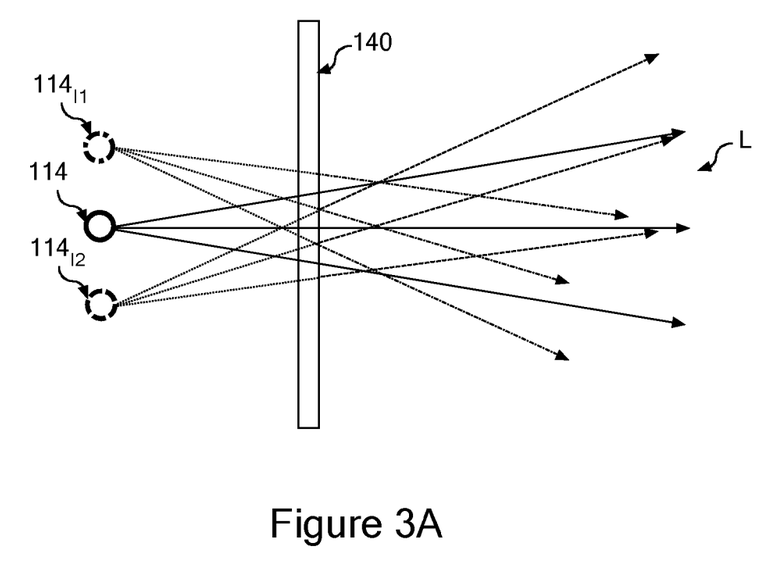
FIG. 3A is a schematic top view of an optical fiber imaged by a prism device of an autostereoscopic display device according to one or more embodiments shown and described herein.

Some embodiments may reduce the number and/or length of optical fiber needed to fully illuminate the display panel of the autostereoscopic display device by use of a prism device. FIG. 3A depicts an embodiment wherein a prism device 140 is positioned in an optical path of the light emitted by the optical fiber 114. It should be understood that only one linear emitter defined by the optical fiber 114 is illustrated in FIG. 3A for ease of illustration. The prism device 140 may create a first fiber image $114_{I1}$ and a second fiber image $114_{I2}$ of the optical fiber 114, thereby creating the impression that there are three linear emitters present rather than one (optical fiber 114 is the only physical optical fiber depicted in FIG. 3A). The prism device 140 may therefore be utilized to reduce the pitch of the linear emitters, and as such, reduce the length of optical fiber and/or number of optical fibers needed to create the desired number of linear emitters. The brightness of the light emitted by the optical fiber 114 may be adjusted to account for the fact that one or more images of the optical fiber 114 is produced. Further, it should be understood that the prism device 140 may be configured to create more than two images of the optical fiber 114.

Figure 3B:
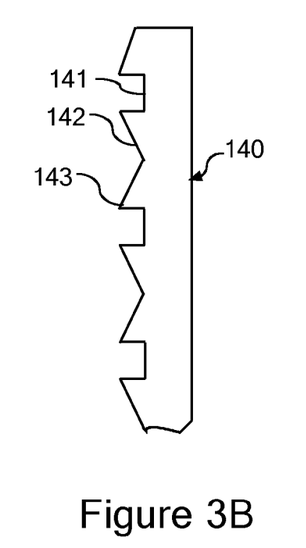
FIG. 3B is a schematic side view of a prism device according to one or more embodiments shown and described herein.

FIG. 3B illustrates a portion of a prism device 140 according to one embodiment. In one embodiment, the prism device 140 may be configured as an angular filter film having a plurality of prisms defined thereon. In the embodiment illustrated in FIG. 3B, the prism device 140, which is optically transmissive to the light emitted by the optical fiber 140, has several microprism features that produce the images of the optical fibers depicted in FIG. 3A. In one embodiment, the microprism features are on the order of 50 microns. The exemplary prism device 140 has a relatively flat portion 141 that does not deviate light, a first angled portion 142 that deviates light in a positive direction (e.g., +θ), and a second angled portion 143 that deviates light in a negative direction (e.g., −θ). The pattern of the relatively flat portion, the first angled portion, and the second angled portion is repeated along the prism device. Light passing through the prism device 140 is transmitted at three different angles such that multiple images of the optical fiber 114 are produced.

The angle of the first and second angled portion 142, 143 may not be equal. Further, prism assemblies according to other embodiments may have more than three distinct angled portions, and/or no relatively flat portion.

Various embodiments of the optical fiber(s) of the illumination apparatus will now be described. As an example and not a limitation, the leaky optical fiber (s) may be configured as a flexible light diffusing waveguide as taught in U.S. Pat. Appl. No. 61/545,713, entitled "Multi-Wavelength Light Source Using Light Diffusing Fibers," filed on Oct. 11, 2011, which is hereby incorporated by reference in its entirety. It is noted that the optical fiber(s) described above may have any configuration such that they emit light from its core and along its length to act as a linear emitter.

Figure 4:
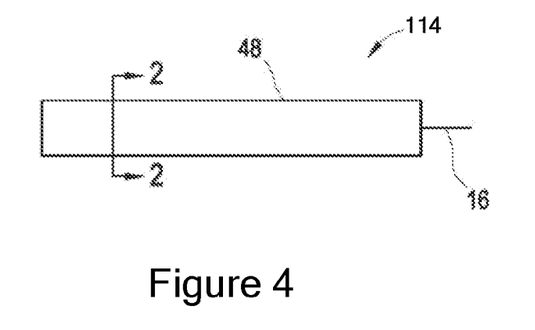
FIG. 4 is a schematic side view of a section of an exemplary light-diffusing optical fiber.
Figure 5:
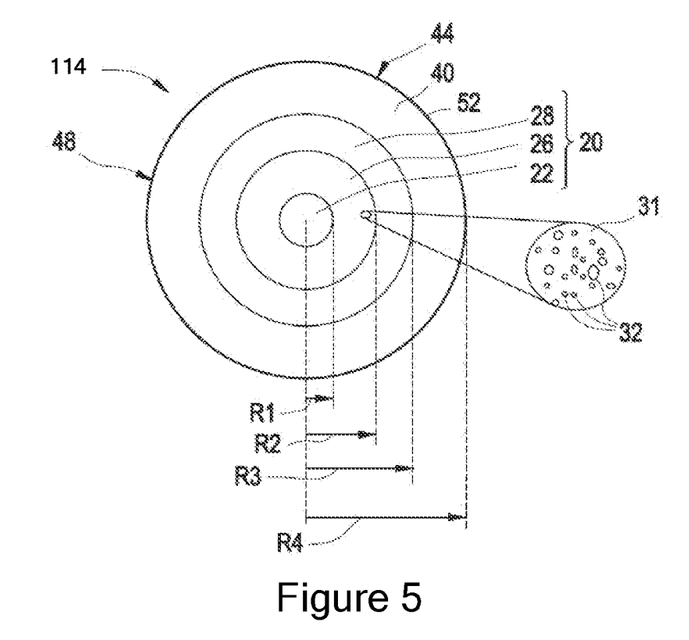
FIG. 5 is a schematic cross-section of the optical fiber of FIG. 4 as viewed along the direction 2-2, according to one or more embodiments shown and described herein.

FIG. 4 is a schematic side view of a section of an example embodiment of a light diffusing fiber with a plurality of voids in the core of the light diffusing optical fiber (hereinafter "fiber") 12 having a central axis ("centerline") 16. FIG. 5 is a schematic cross-section of light diffusing optical fiber 114 as viewed along the direction 2-2 in FIG. 4. Light diffusing fiber 114 can be, for example, any one of the various types of optical fiber with a nano-structured fiber region having periodic or non-periodic nano-sized structures 32 (for example voids). In an example embodiment, fiber 114 includes a core 20 divided into three sections or regions. These core regions are: a solid central portion 22, a nano-structured ring portion (inner annular core region) 26, and outer, solid portion 28 surrounding the inner annular core region 26. A cladding region 40 ("cladding") surrounds the annular core 20 and has an outer surface. The cladding 40 may have low refractive index to provide a high numerical aperture (NA). The cladding 40 can be, for example, a low index polymer such as UV or thermally curable fluoroacrylate or silicone.

In other exemplary embodiments described below, coating 44 is designed to enhance the distribution and/or the nature of "radiated light" that passes from core 20 through cladding 40. The outer surface of the cladding 40 or the outer surface of optional coating 44 represents the "sides" 48 of fiber 114 through which light traveling in the fiber is made to exit via scattering, as described herein.

A protective cover or sheath (not shown) optionally covers cladding 40. Fiber 114 may include a fluorinated cladding 40, but the fluorinated cladding is not needed if the fibers are to be used in short-length applications where leakage losses do not degrade the illumination properties.

In some exemplary embodiments, the core region 26 of light diffusing fiber 114 comprises a glass matrix ("glass") 31 with a plurality of non-periodically disposed nano-sized structures (e.g., "voids") 32 situated therein, such as the example voids shown in detail in the magnified inset of FIG. 5. In another example embodiment, voids 32 may be periodically disposed, such as in a photonic crystal optical fiber, wherein the voids typically have diameters between about $1 \times 10^{-6}$ m and $1 \times 10^{-5}$ m. Voids 32 may also be non-periodically or randomly disposed. In some exemplary embodiment, glass 31 in region 26 is a fluorine-doped silica, while in other embodiment the glass is an undoped pure silica. Preferably the diameters of the voids are at least 10 nm.

The nano-sized structures 32 scatter the light away from the core 20 and toward the outer surface of the fiber. The scattered light is then "diffused" through of the outer surface of the fiber 114 to provide the desired illumination. That is, most of the light is diffused (via scattering) through the sides of the fiber 114, along the fiber length.

Glass in core regions 22 and 28 may include updopants, such as Ge, Al, and/or P. By "non-periodically disposed" or "non-periodic distribution," it is meant that when one takes a cross-section of the optical fiber (such as shown in FIG. 5), the voids 32 are randomly or non-periodically distributed across a portion of the fiber. Similar cross sections taken at different points along the length of the fiber will reveal different cross-sectional void patterns, i.e., various cross sections will have different voids patterns, wherein the distributions of voids and sizes of voids do not match. That is, the voids are non-periodic, i.e., they are not periodically disposed within the fiber structure. These voids are stretched (elongated) along the length (i.e. parallel to the longitudinal axis) of the optical fiber, but do not extend the entire length of the entire fiber for typical lengths of transmission fiber. While not wishing to be bound by theory, it is believed that the voids extend less than 10 meters, and in many cases less than 1 meter along the length of the fiber.

The light diffusing fiber 114 as used herein in the illumination system discussed below can be made by methods which utilize preform consolidation conditions which result in a significant amount of gases being trapped in the consolidated glass blank, thereby causing the formation of voids in the consolidated glass optical fiber preform. Rather than taking steps to remove these voids, the resultant preform is used to form an optical fiber with voids, or nano-sized structures, therein. The resultant fiber's nano-sized structures or voids are utilized to scatter or guide the light out of the fiber, via its sides, along the fiber length. That is, the light is guided away from the core 20, through the outer surface of the fiber, to provide the desired illumination.

As used herein, the diameter of a nano-sized structure such as a void is the longest line segment contained within the nano-sized structure whose endpoints are at the boundary of the nano-sized structure when the optical fiber is viewed in perpendicular cross-section transverse to the longitudinal axis of the fiber. A method of making optical fibers with nano-sized voids is described, for example, in U.S. patent application Ser. No. 11/583,098 (United States Patent Application Publication No. 2007/0104437 A1), which is incorporated herein by reference.

As described above, in some embodiments of fiber 114, core sections 22 and 28 comprise silica doped with germanium, i.e., germania-doped silica. Dopants other than germanium, singly or in combination, may be employed within the core, and particularly at or near the centerline 16, of the optical fiber to obtain the desired refractive index and density. In at least some embodiments, the relative refractive index profile of the optical fiber disclosed herein is non-negative in sections 22 and 28. These dopants may be, for example, Al, Ti, P, Ge, or a combination thereof. In at least some embodiments, the optical fiber contains no index-decreasing dopants in the core. In some embodiments, the relative refractive index profile of the optical fiber disclosed herein is non-negative in sections 22, 24 and 28.

In some examples of fiber 114 as used herein, core 20 is a graded-index core, and preferably, the refractive index profile of the core has a parabolic (or substantially parabolic) shape; for example, in some embodiments, the refractive index profile of core 20 has an α-shape with an α value of about 2, preferably between 1.8 and 2.3 as measured at 850 nm. In other embodiments, one or more segments of the refractive index profile have a substantially step index shape with an α value greater than 8, more preferably greater than 10 even more preferably greater than 20 as measured at 850 nm. In some embodiments, the refractive index of the core may have a centerline dip, wherein the maximum refractive index of the core, and the maximum refractive index of the entire optical fiber, is located a small distance away from centerline 16, but in other embodiments the refractive index of the core has no centerline dip, and the maximum refractive index of the core, and the maximum refractive index of the entire optical fiber, is located at the centerline.

Figure 6A:
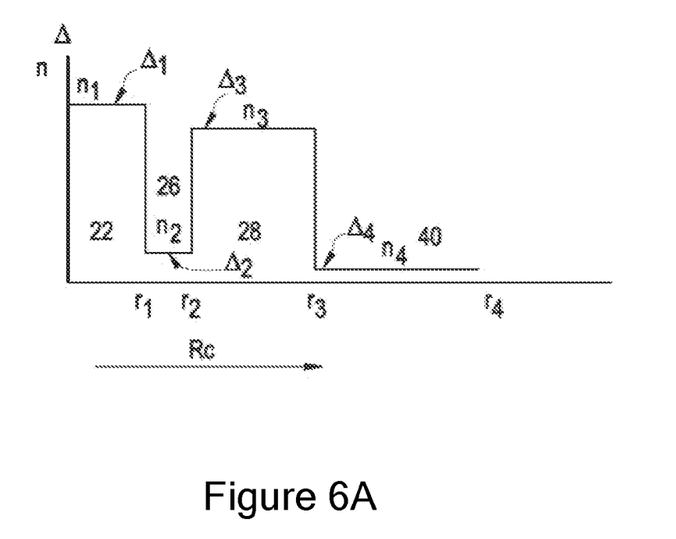
FIG. 6A is a schematic illustration of a relative refractive index plot versus fiber radius for an exemplary light diffusing fiber.

In an exemplary embodiment, fiber 114 has a silica-based core 20 and depressed index (relative to silica) polymer cladding 40. The low index polymer cladding 40 preferably has a relative refractive index that is negative, more preferably less than −0.5% and even more preferably less than −1%. In some exemplary embodiments cladding 40 has thickness of 20 microns or more. In some exemplary embodiments cladding 40 has a lower refractive index than the core, and a thickness of 10 microns or more (e.g., 20 microns or more). In some exemplary embodiments, the cladding has an outer diameter 2 times Rmax, e.g., of about 125 microns (e.g., 120 microns to 130 microns, or 123 microns to 128 microns). In other embodiments the cladding has a diameter that is less than 120 microns, for example 60 or 80 microns. In other embodiments the outer diameter of the cladding is greater than 200 microns, greater than 300 microns, or greater than 500 microns. In some embodiments, the outer diameter of the cladding has a constant diameter along the length of fiber 114. In some embodiments, the refractive index of fiber 114 has radial symmetry. Preferably, the outer diameter 2R3 of core 20 is constant along the length of the fiber. Preferably the outer diameters of core sections 22, 26, 28 are also constant along the length of the fiber. By constant, we mean that the variations in the diameter with respect to the mean value are less than 10%, preferably less than 5% and more preferably less than 2%. FIG. 6A is a plot of the exemplary relative refractive index Δ versus fiber radius for an example fiber 114 shown in FIG. 5 (solid line). The core 20 may also have a graded core profile, with α-profile having, for example, α-value between 1.8 and 2.3 (e.g., 1.8 to 2.1).

FIG. 6A is a plot of the exemplary relative refractive index Δ versus fiber radius for an example fiber 114 shown in FIG. 5 (solid line). The core 20 may also have a graded core profile, characterized, for example, by an α-value between 1.7 and 2.3 (e.g., 1.8 to 2.3). An alternative exemplary refractive index profile is illustrated by the dashed lines. Core region 22 extends radially outwardly from the centerline to its outer radius, R1, and has a relative refractive index profile $\Delta_1(r)$ corresponding to a maximum refractive index $n_1$ (and relative refractive index percent $\Delta_{1MAX}$). In this embodiment, the reference index $n_{REF}$ is the refractive index at the cladding. The second core region (nano-structured region) 26 has minimum refractive index $n_2$, a relative refractive index profile $\Delta_2(r)$, a maximum relative refractive index $\Delta_{2MAX}$, and a minimum relative refractive index $\Delta_{2MIN}$, where in some embodiments $\Delta_{2MAX}=\Delta_{2MIN}$. The third core region 28 has a maximum refractive index n3, a relative refractive index profile $\Delta_3(r)$ with a maximum relative refractive index $\Delta_{3Max}$ and a minimum relative refractive index $\Delta_{3MIN}$, where in some embodiments $\Delta_{3MAX}=\Delta_{3MIN}$. In this embodiment the annular cladding 40 has a refractive index $n_4$, a relative refractive index profile $\Delta_4(r)$ with a maximum relative refractive index $\Delta_{4MAX}$, and a minimum relative refractive index $\Delta_{4MIN}$. In some embodiments $\Delta_{4MAX}=\Delta_{4MIN}$. In some embodiments, $\Delta_{1MAX}>\Delta_{4MAX}$ and $\Delta_{3MAX}>\Delta_{4MAX}$. In some embodiments $\Delta_{2MIN}>\Delta_{4MAX}$. In the embodiment shown in FIGS. 5 and 6A, $\Delta_{1MAX}>\Delta_{3MAX}>\Delta_{2MAX}>\Delta_{4MAX}$. In this embodiment the refractive indices of the regions have the following relationship $n_1>n_3>n_2>n_4$.

In some embodiments, core regions 22, 28 have a substantially constant refractive index profile, as shown in FIG. 6A with a constant $\Delta_1(r)$ and $\Delta_3(r)$. In some of these embodiments, $\Delta_2(r)$ is either slightly positive ($0<\Delta_2(r)<0.1\%$), negative ($-0.1\%<\Delta_2(r)<0$), or 0%. In some embodiments the absolute magnitude of $\Delta2(r)$ is less than 0.1%, preferably less than 0.05%. In some embodiments, the outer cladding region 40 has a substantially constant refractive index profile, as shown in FIG. 6A with a constant $\Delta_4(r)$. In some of these embodiments, $\Delta_4(r)=0\%$. The core section 22 has a refractive index where $\Delta 1(r) \geq 0\%$. In some embodiments, the void-filled region 26 has a relative refractive index profile $\Delta_2(r)$ having a negative refractive index with absolute magnitude less than 0.05%, and $\Delta_3(r)$ of the core region 28 can be, for example, positive or zero. In at least some embodiments, $n_1 > n_2$ and $n_3 > n_4$.

In some embodiments the cladding 40 has a refractive index $-0.05\% < \Delta_4(r) < 0.05\%$. In other embodiments, the cladding 40 and the core portions portion 20, 26, and 28 may comprise pure (undoped) silica.

In some embodiments, the cladding 40 comprises pure or F-doped silica. In some embodiments, the cladding 40 comprises pure low index polymer. In some embodiments, nano-structured region 26 comprises pure silica comprising a plurality of voids 32. Preferably, the minimum relative refractive index and the average effective relative refractive index, taking into account the presence of any voids, of nano-structured region 26 are both less than −0.1%. The voids or voids 32 may contain one or more gases, such as argon, nitrogen, oxygen, krypton, or $SO_2$ or can contain a vacuum with substantially no gas. However, regardless of the presence or absence of any gas, the average refractive index in nano-structured region 26 is lowered due to the presence of voids 32. Voids 32 can be randomly or non-periodically disposed in the nano-structured region 26, and in other embodiments, the voids are disposed periodically therein.

In some embodiments, the plurality of voids 32 comprises a plurality of non-periodically disposed voids and a plurality of periodically disposed voids.

In example embodiments, core section 22 comprises germania doped silica, core inner annular region 28 comprises pure silica, and the cladding annular region 40 comprises a glass or a low index polymer. In some of these embodiments, nano-structured region 26 comprises a plurality of voids 32 in pure silica; and in yet others of these embodiments, nano-structured region 26 comprises a plurality of voids 32 in fluorine-doped silica.

In some embodiments, the outer radius, Rc, of core is greater than 10 microns and less than 600 microns. In some embodiments, the outer radius Rc of core is greater than 30 microns and/or less than 400 microns. For example, Rc may be 125 microns to 300 microns. In other embodiments, the outer radius Rc of the core 20 (please note that in the embodiment shown in FIG. 6A, Rc=R3) is larger than 50 microns and less than 250 microns. The central portion 22 of the core 20 has a radius in the range $0.1Rc \leq R_1 \leq 0.9Rc$, preferably $0.5Rc \leq R_1 \leq 09Rc$. The width W2 of the nano-structured ring region 26 is preferably $0.05Rc \leq W2 \leq 0.9Rc$, preferably $0.1Rc \leq W2 \leq 0.9Rc$, and in some embodiments $0.5Rc \leq W2 \leq 0.9Rc$ (a wider nano-structured region gives a higher scattering-induced attenuation, for the same density of nano-sized structures). The solid glass core region 28 has a width Ws=W3 such that $0.1Rc > W3 > 0.9Rc$. Each section of the core 20 comprises silica based glass. The radial width $W_2$ of nano-structured region 26 is preferably greater than 1 micron. For example, $W_2$ may be 5 microns to 300 microns, and preferably 200 microns or less. In some embodiments, $W_2$ is greater than 2 microns and less than 100 microns. In other embodiments, W2 is greater than 2 microns and less than 50 microns. In other embodiments, $W_2$ is greater than 2 microns and less than 20 microns. In some embodiments, $W_2$ is at least 7 microns. In other embodiments, $W_2$ is greater than 2 microns and less than 12 microns. The width $W_3$ of core region 28 is (R3−R2) and its midpoint $R_{3MID}$ is (R2+R3)/2. In some embodiments, $W_3$ is greater than 1 micron and less than 100 microns.

The numerical aperture (NA) of fiber 114 is preferably equal to or greater than the NA of a light source directing light into the fiber. Preferably the numerical aperture (NA) of fiber 114 is greater than 0.2, in some embodiments greater than 0.3, and even more preferably greater than 0.4.

In some embodiments, the core outer radius R1 of the first core region 22 is preferably not less than 24 microns and not more than 50 microns, i.e. the core diameter is between about 48 and 100 microns. In other embodiments, R1>24 microns; in still other embodiments, R1>30 microns; in yet other embodiments, R1>40 microns.

In some embodiments, $|\Delta_2(r)| < 0.025\%$ for more than 50% of the radial width of the annular inner portion 26, and in other embodiments $|\Delta_2(r)| < 0.01\%$ for more than 50% of the radial width of region 26. The depressed-index annular portion 26 begins where the relative refractive index of the cladding first reaches a value of less than −0.05%, going radially outwardly from the centerline. In some embodiments, the cladding 40 has a relative refractive index profile $\Delta_4(r)$ having a maximum absolute magnitude less than 0.1%, and in this embodiment $\Delta_{4MAX} < 0.05\%$ and $\Delta_{4MIN} > -0.05\%$, and the depressed-index annular portion 26 ends where the outermost void is found.

Cladding structure 40 extends to a radius R4, which is also the outermost periphery of the optical fiber. In some embodiments, the width of the cladding, R4−R3, is greater than 20 microns; in other embodiments R4−R3 is at least 50 microns, and in some embodiments, R4−R3 is at least 70 microns.

In another embodiment, the entire core 20 is nano-structured (filled with voids, for example), and the core 20 is surrounded by the cladding 40. The core 20 may have a "step" refractive index delta, or may have a graded core profile, with α-profile having, for example, α-value between 1.8 and 2.3.

Figure 6B:
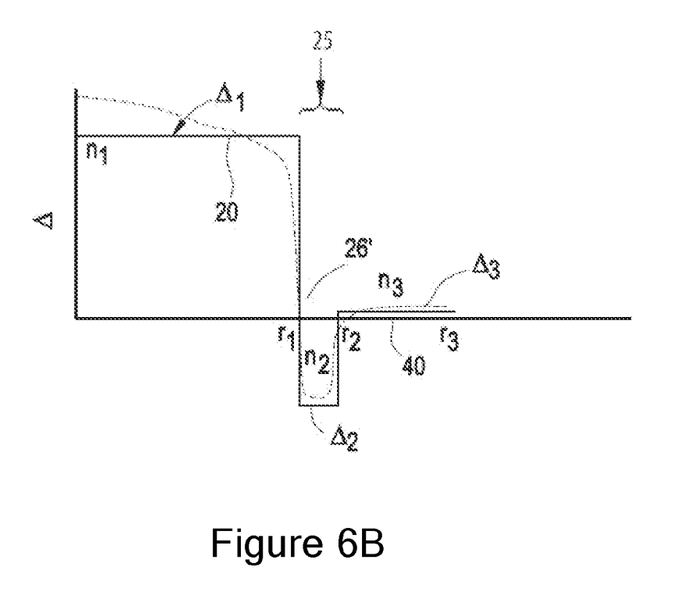
FIG. 6B is a schematic illustration of a relative refractive index plot versus fiber radius for another exemplary light diffusing fiber.

FIG. 6B illustrates schematically yet another exemplary embodiment of light diffusing fiber 114. The fiber of FIG. 6B includes a core 20 with a relative refractive index $\Delta_1$, a nano-structured region 26' situated over and surrounding the core 20. The core 20 may have a "step" index profile, or a graded core profile, with α-profile having, for example, α-value between 1.8 and 2.3.

In this exemplary embodiment (see FIG. 6B) the nano-structured region 26' is an annular ring with a plurality of voids 32. In this embodiment, the width of region 26' can be as small as 1-2 microns, and may have a negative average relative refractive index $\Delta_2$. Cladding 40 surrounds the nano-structured region 26'. The (radial) width of cladding 40 may be as small as 1 micron, and the cladding may have either a negative, a positive or 0% relative refractive index, (relative to pure silica). The main difference between examples in FIGS. 6A and 6B is that nano-structured region in shown in FIG. 6A is located in the core 20 of the light diffusing fiber 114, and in FIG. 6B it is located at the core/clad interface. The depressed-index annular portion 26' begins where the relative refractive index of the core first reaches a value of less than −0.05%, going radially outwardly from the centerline. In the embodiment of FIG. 6B, the cladding 40 has a relative refractive index profile $\Delta_3(r)$ having a maximum absolute magnitude less than 0.1%, and in this embodiment $\Delta_{3MAX} < 0.05\%$ and $\Delta_{3MIN} > -0.05\%$, and the depressed-index annular portion 26 ends where the outmost void occurs in the void-filled region.

In the embodiment shown in FIG. 6B, the index of refraction of the core 20 is greater than the index of refraction $n_2$ of the annular region 26', and the index of refraction n1 of the cladding 40 is also greater than the index of refraction $n_2$.

Figure 6C:
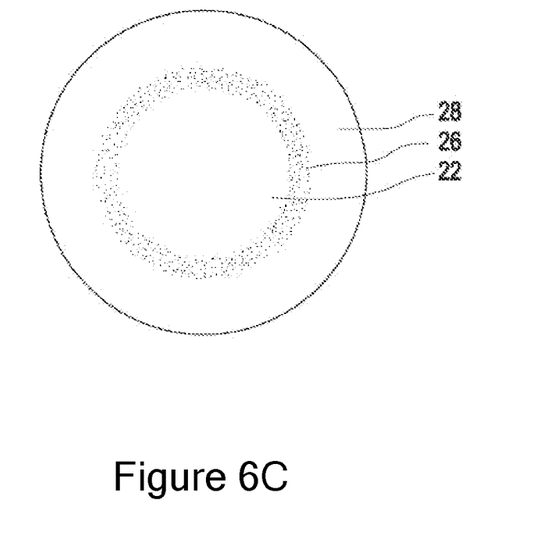
FIG. 6C illustrates another exemplary light diffusing fiber.

FIG. 6C illustrates a core 20 of one embodiment of an optical fiber 114 that has been made. This fiber has a first core region 22 with an outer radius R1 of about 33.4 microns, a nano-structured region 26 with an outer radius R2=42.8 microns, a third core region 28 with an outer radius R3=62.5 microns, and a polymer cladding 40 with an outer radius R4 (not shown) of 82.5 microns). In this embodiment, the material of the core is pure silica (undoped silica), the material for cladding was low index polymer (e.g., UV curable silicone having a refractive index of 1.413 available from Dow-Corning of Midland, Michigan under product name Q3-6696) which, in conjunction with the glass core, resulted in fiber NA of 0.3. The optical fiber 114 had a relatively flat (weak) dependence on wavelength, compared to standard single-mode transmission fiber, such as for example SMF-28e® fiber. In standard single mode (such as SMF-28®) or multimode optical fibers, the losses at wavelengths less than 1300 nm are dominated by Rayleigh scattering. These Rayleigh scattering losses are determined by the properties of the material and are typically about 20 dB/km for visible wavelengths (400-700 nm). The wavelength dependence of Rayleigh scattering losses is proportional to $\lambda^{-p}$ with p≈4. The exponent of the wavelength dependent scattering losses in the fiber comprising at least one nanostructured region is less than 2, preferably less than 1 over at least 80% (for example greater than 90%) in the 400 nm-1100 nm wavelength range. The average spectral attenuation from 400 nm to 1100 nm was about 0.4 dB/m when the fiber was drawn at 40 g tension and was about 0.1 dB/m when the fiber 114 was drawn at 90 g tension. In this embodiment, the nano-sized structures contain $SO_2$ gas. Voids filled with $SO_2$ in the nano-structured ring may greatly contribute to scattering. Furthermore, when $SO_2$ gas was used to form the nano-structures, it has been discovered that this gas allows a thermally reversible loss to be obtained, i.e., below 600° C. the nano-structured fiber scatters light, but above 600° C. the same fiber will guide light. This unique behavior that $SO_2$ imparts is also reversible, in that upon cooling the same fiber below 600° C., the fiber 114 will act as light diffusing fiber and will again generate an observable scattering effect.

In preferred embodiments, the uniformity of illumination along the fiber length is controlled such that the minimum scattering illumination intensity is not less than 0.7 of the maximum scattering illumination intensity, by controlling fiber tension during the draw process; or by selecting the appropriate draw tension (e.g., between 30 g and 100 g, or between 40 g and 90 g).

For the purposes of describing and defining embodiments of the present disclosure it is noted that the term "substantially" is utilized to represent the inherent degree of uncertainty that may be attributed to any quantitative comparison, value, measurement, or other representation.

It is noted that recitations herein of a component of a particular embodiment being "programmed" in a particular way, "configured" or "programmed" to embody a particular property, or function in a particular manner, are structural recitations as opposed to recitations of intended use. More specifically, the references herein to the manner in which a component is "programmed" or "configured" denotes an existing physical condition of the component and, as such, is to be taken as a definite recitation of the structural characteristics of the component.

It is also noted that the use of the phrase "at least one" in describing a particular component or element does not imply that the use of the term "a" in describing other components or elements excludes the use of more than one for the particular component or element. More specifically, although a component may be described using "a," it is not to be interpreted as limiting the component to only one.

While particular embodiments have been illustrated and described herein, it should be understood that various other changes and modifications may be made without departing from the spirit and scope of the claimed subject matter. More specifically, although some aspects of the embodiments described are identified herein as preferred or particularly advantageous, it is contemplated that the claimed subject matter is not necessarily limited to these preferred aspects.

The invention claimed is:

1. An illumination apparatus for an autostereoscopic display device, the illumination apparatus comprising:
  a substrate comprising a front face;
  an optical fiber arranged on the substrate such that the optical fiber defines a plurality of straight portions, the optical fiber comprising a first end and a core, wherein the optical fiber radially scatters light from its sides such that light is guided away from the core of the optical fiber and the straight portions act as linear emitters; and
  a light source optically coupled to the first end of the optical fiber, the light source emitting light at one or more desired wavelengths, wherein:
  the core of the optical fiber comprises:
    a region with a plurality of nano-sized structures within the core configured to scatter guided light via the plurality of nano-sized structures towards an outer surface of the optical fiber; and
    a solid glass region surrounding the region with a plurality of nano-sized structures having a higher refractive index delta than the region with a plurality of nano-sized structures; and
  the optical fiber further comprises a low index cladding surrounding the core, the cladding having a lower refractive index delta than the solid glass region.

2. The illumination apparatus of claim 1, wherein the optical fiber is arranged on the substrate such that individual straight portions of the plurality of straight portions are separated by a bent portion of the optical fiber.

3. The illumination apparatus of claim 1, wherein a number of straight portions of the optical fiber of the illumination apparatus is approximately equal to a number of pixels along a width of a display panel of the autostereoscopic display device divided by a number of simultaneous views N.

4. The illumination apparatus of claim 1, wherein the front face of the substrate comprises a plurality of grooves and the plurality of straight portions of the optical fiber is positioned in the plurality of grooves.

5. The illumination apparatus of claim 1, further comprising a transparent substrate positioned on the optical fiber such that the optical fiber is positioned between the substrate and the transparent substrate.

6. The illumination apparatus of claim 1, further comprising a second optical fiber arranged on the substrate such that the second optical fiber defines a plurality of straight portions that act as the linear emitters.

7. The illumination apparatus of claim 1, further comprising a prism device positioned in an optical path of the optical fiber, the prism device creating two or more images of the optical fiber.

8. The illumination apparatus of claim 7, wherein the prism device comprises a relatively flat portion and an angled portion.

9. The illumination apparatus of claim 7, wherein the prism device comprises an angular filter film.

10. The illumination apparatus of claim 1, further comprising a termination device coupled to a second end of the optical fiber.

11. The illumination apparatus of claim 1, wherein the light source comprises a laser.

12. An autostereoscopic display device comprising:
a display panel comprising an array of pixels;
an illumination apparatus comprising:
  a substrate comprising a front face;
  an optical fiber arranged on the substrate such that the optical fiber defines a plurality of straight portions, the optical fiber comprising a first end and a core, wherein the optical fiber radially scatters light from its sides such that light is guided away from the core of the optical fiber and the straight portions act as linear emitters that emit light toward the display panel; and
a light source optically coupled to the first end of the optical fiber, the light source emitting light at one or more desired wavelengths, wherein:
the core of the optical fiber comprises:
  a region with a plurality of nano-sized structures within the core configured to scatter guided light via the plurality of nano-sized structures towards an outer surface of the optical fiber; and
  a solid glass region surrounding the region with a plurality of nano-sized structures having a higher refractive index delta than the region with a plurality of nano-sized structures; and
the optical fiber further comprises a low index cladding surrounding the core, the cladding having a lower refractive index delta than the solid glass region.

13. The illumination apparatus of claim 12, wherein the optical fiber is arranged on the substrate such that individual straight portions of the plurality of straight are separated by a bent portion of the optical fiber.

14. The illumination apparatus of claim 12, wherein a number of straight portions of the illumination apparatus is approximately equal to a number of pixels along a width of the array of pixels divided by a number of simultaneous views N, and wherein the light emitted by the light source passes through adjacent pixels to create light cones separated by a distance of 70 to 90 mm.

15. The illumination apparatus of claim 12, wherein the front face of the substrate comprises a plurality of grooves and the plurality of straight portions of the optical fiber is positioned in the plurality of grooves.

16. The illumination apparatus of claim 12, wherein the illumination apparatus further comprises a transparent substrate positioned on the optical fiber such that the optical fiber is positioned between the substrate and the transparent substrate.

17. The illumination apparatus of claim 12 wherein the illumination apparatus further comprises a second optical fiber arranged on the substrate such that the second optical fiber defines a plurality of straight portions that act as the linear emitters.

18. The illumination apparatus of claim 12, wherein the illumination apparatus further comprises a prism device positioned in an optical path of the optical fiber, the prism device creating two or more images of the optical fiber.

19. The illumination apparatus of claim 18, wherein the prism device comprises a relatively flat portion and an angled portion.

20. The illumination apparatus of claim 18, wherein the prism device comprises an angular filter film.

21. The illumination apparatus of claim 12, wherein the light source comprises a laser.

22. An illumination apparatus for an autostereoscopic display device, the illumination apparatus comprising:
a substrate comprising a front face;
a plurality of optical fibers arranged on the substrate such that individual optical fibers of the plurality of optical fibers defines at least one straight portion, each of the individual optical fibers comprising a first end and a core, wherein the each of the individual optical fibers radially scatter light from its sides such that light is guided away from the core and the straight portions provided by the plurality of optical fibers act as linear emitters; and
a light source optically coupled to the first end of each optical fiber of the plurality of optical fibers, the light source emitting light at one or more desired wavelengths, wherein the core of each individual optical fiber comprises:
a region with a plurality of nano-sized structures within the core configured to scatter guided light via the plurality of nano-sized structures towards an outer surface of the optical fiber; and
a solid region surrounding he region with a plurality of nano-sized structures having a higher refractive index delta than the region with a plurality of nano-sized structures; and
each individual optical fiber further comprises a low index cladding surrounding the core, the cladding having a lower refractive index delta than the solid glass region.

* * * * *